Patented Oct. 31, 1950

2,527,510

UNITED STATES PATENT OFFICE 2,527,510

1,4-ADDITION PRODUCTS OF BUTADIENE NITRILE AND CERTAIN ORGANIC NITROGEN COMPOUNDS

Sidney James Allen, London, and James Gordon Napier Drewitt, Spondon, near Derby, England, assignors to Celanese Corporation of America, a corporation of Delaware No Drawing. Application June 29, 1949, Serial No. 102,166. In Great Britain March 15, 1945

Section 1, Public Law 690, August 8, 1946
Patent expires March 15, 1965

4 Claims. (Cl. 260—465.5)

This invention relates to the production of organic compounds and is based upon the discovery that 1.3-butadiene-4-nitrile and analogous compounds are of great value in the production of intermediates for polymers, wetting agents, emulsifying agents and numerous other applications. The present application is a continuation-in-part of our application S. No. 762,800 filed July 22, 1947.

We have found that 1.3-butadiene-4-nitrile and 1- or 4-substitution products thereof combine very smoothly with substances containing labile hydrogen atoms attached to nitrogen, for example amines, including hydrazine and its derivatives, amides and ammonia.

Generally the reaction is assisted by means of alkaline catalysts, of which caustic soda or other caustic alkali, sodium carbonate and the alkali cyanides, for example sodium cyanide, are the most important. However, other catalysts, for example sodium alcoholates, such as sodium methoxide, sodium sulphite, trimethyl benzyl ammonium hydroxide and similar quaternary bases can also be used. In some cases, particularly where the compound containing the labile hydrogen atom is an amine, no catalyst at all need be used, or alternatively acid catalysts, for example acetic acid, sulphuric acid or hydrated copper sulphate may be used. The addition of hydrogen chloride requires no catalyst.

Many of the reactions take place at ordinary temperatures merely on standing. However, where the reaction is sluggish, the reaction rate may be accelerated by applying gentle heat, or even by heating up to 80° or more. The reaction may be effected in presence or absence of an inert diluent.

Where the compound to be reacted with the butadiene nitrile contains only one labile hydrogen atom, the proportions of reagents used are relatively immaterial and are best arranged with a view to obtaining the maximum yield from the more expensive reagent, i. e. the cheaper reagent is used in excess. Where the compound to be reacted with the butadiene nitrile contains two or more labile hydrogen atoms, the proportions of the reagents are, however, chosen with a view to the avoidance as far as possible of undesired by-products. Thus if only one mole of butadiene nitrile is required to react with a compound containing more than one labile hydrogen atom, then an excess of the latter compound is used, for instance an excess of 5 to 10 or even 20 moles. If all the labile hydrogen atoms are to be displaced, then an excess of the butadiene nitrile is used.

Important bodies containing labile hydrogen atoms for use according to the present invention are ammonia, amides, e. g. acetamide, and amines, and of these the most important are the primary amines, including the primary diamines such as ethylene diamine, trimethylene diamine, tetramethylene diamine, pentamethylene diamine and hexamethylene diamine. Generally these substances do not require the use of a catalyst, being already sufficiently basic in themselves. In some cases, the addition of acid is of advantage. By reacting one mole of a diprimary amine, such as ethylene diamine, with two moles of butadiene nitrile, there is produced a diaminodinitrile, which on reduction yields a tetramine which is suitable for conversion into a polyamide, according to our earlier U. S. application S. No. 591,408 filed May 1, 1945, now abandoned. Saponification followed by reduction produces a dicarboxylic acid containing two secondary amino groups. Generally with these additions of butadiene nitrile to ammonia or amines, it is advisable not to distil the product, since the reaction appears to be to some extent reversible. This is of very little moment if the substance is to undergo a further treatment, for example reduction and/or saponification, since such a treatment can be applied directly to the crude reaction product.

In some cases, the presence of a strong base such as caustic soda produces a simultaneous saponification of the nitrile group of the butadiene nitrile. For example, by treating butadiene nitrile with ammonium hydroxide and ammonium carbonate in presence of caustic soda or other strong mineral base, the amino-pentenoic acid may be produced directly without the necessity for a subsequent saponification.

So far the description has been limited to the addition to compounds containing labile hydrogen atoms of 1.3-butadiene-4-nitrile. 1.4-substitution products of the butadiene nitrile may be used, for example sorbonitrile

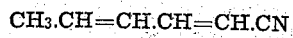
$CH_3.CH=CH.CH=CH.CN$ cinnamal acetonitrile C₆H₅.CH=CH.CH=CH.CN, α-cyano-sorbic acid

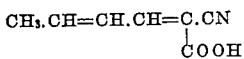

or its esters, cinnamal cyanacetic acid

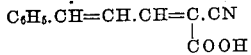

or its methyl or ethyl ester, cinnamal malononitrile

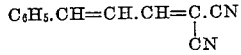

and cinnamal benzyl cyanide

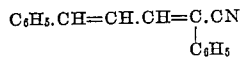

All these compounds are of the general formula

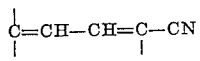

They are all 1- and/or 4-derivatives of 1.3-butadiene-4-nitrile CH₂=CH.CH=CH.CN itself.

The following examples illustrate the invention but are not to be considered as limiting it in any way. In all the examples the parts are by weight and the butadiene nitrile is stabilised with hydroquinone.

Example 1

60 parts of diethylamine were mixed with 40 parts of 1,3-butadiene nitrile (about 8 moles to 5) and allowed to stand for two hours. The mixture was then slowly warmed under reflux and finally boiled under reflux for six hours. The reflux was removed and the excess diethylamine removed by rapid distillation at atmospheric pressure. The residue was dissolved in 250 parts of absolute ethyl alcohol and transferred to a shaking autoclave together with 20 parts of Raney nickel. The reaction mixture was hydrogenated under a hydrogen pressure of 100 lbs. per sq. in. at 70–90° C. After about 5 hours (or when the requisite amount of hydrogen had been absorbed), the autoclave was cooled and the contents filtered to remove catalyst. The product was fractionated and the fraction boiling at 86–89° C. (10 mm.) collected. It was N.N-diethyl-pentamethylene diamine, boiling point 183–184° C. at 760 mm.; melting point of picrate 110.5° C.

A similar preparation using di-isobutyl amine yielded N.N-di-isobutyl-pentamethylene diamine, boiling point 125–126° C. at 10 mm.

Example 2

To 130 parts of a 70% aqueous solution of monoethylamine, there were added slowly 79 parts of 1.3-butadiene-4-nitrile while keeping the temperature at about 25° C. The mixture was agitated for 4 hours at this temperature and then heated to boiling under reflux. The mixture was allowed to cool and left overnight and excess ethylamine and some water removed under reduced pressure. The residue was then mixed with 10 times its weight of 85% aqueous methyl alcohol and reduced with hydrogen, using palladium as catalyst, at atmospheric temperature and 1.5–2 atmospheres pressure until about 1 mole of hydrogen had been absorbed. The product was hydrolysed by boiling with 25% aqueous hydrochloric acid. The final product proved to be δ-ethylamino-n-valeric acid (M. P. after recrystallisation from alcohol-ether 138–139° C.).

Example 3

79 parts of 1.3-butadiene-4-nitrile were added slowly to 85 parts of piperidine, the temperature being kept at 10–20° C. When the addition was complete, the reaction mixture was allowed to stand overnight and then heated to 100° C. for a quarter of an hour. The product, after cooling, was mixed with ethyl alcohol and hydrogenated as in Example 1. After filtering off the catalyst, ethyl alcohol was removed at atmospheric pressure and the residue fractionally distilled, the fraction boiling between 112 and 118° C. at 13 mms. being collected. It yielded a benzoyl derivative of melting point 74° C. and was N-(ε-amino-n-amyl)-piperidine, boiling point 238–239° C. at atmospheric pressure.

Example 4

To a mixture of 102 parts of redistilled pentamethylene diamine and 100 parts of water, 158 parts of 1.3-butadiene-4-nitrile were added slowly while cooling. The mixture was allowed to stand for 2 hours and then heated gradually to 100° C. during ½ hour and maintained at that temperature for a further ¼ hour. The water was removed under reduced pressure. The product was diluted with 900 parts of ethyl formate and 70 parts of Raney nickel added and hydrogenation effected at 100–120° C. and 1400 lbs. per square inch pressure. The Raney nickel was filtered off, the excess ethyl fumarate removed and the product worked up by fractional distillation and proved to be a syrupy hygroscopic compound giving a picrate of M. P. 194–195° C. (N=18.61%) after recrystallisation from water.

Example 5

14.7 parts of phthalimide and 39.5 parts of 1.3-butadiene-4-nitrile were mixed in a vessel fitted with a reflux condenser and a side inlet with a tube reaching to a point below the liquid level. The mixture was heated on a water-bath for half an hour and while continuing heating 1 part of Triton B (about 35% solution of trimethyl benzyl ammonium hydroxide) was added very slowly through the side inlet. The phthalimide went slowly into solution (if, at 15 minutes after the catalyst addition is complete, some phthalimide still remains undissolved, a further small addition of catalyst may be made). Heating was continued for a further 15 minutes after solution was complete. Excess butadiene nitrile was removed by heating on the water bath under reduced pressure. The product was then subjected to hydrogenation in alcohol as described in Example 1 and was finally hydrolysed by heating with fuming hydrochloric acid at 120° C. The final product was pentamethylene diamine (diphthalyl derivative M. P. 186–7° C.). Hydrogenation of the adduct by the method described in Example 2, followed by hydrolysis, yielded δ-amino-valeric acid.

Having described our invention, what we deside to secure by Letters Patent is:

1. Process for the production of intermediates, which comprises reacting at atmospheric pressure 1.3-butadiene-4-nitrile with an organic compound containing labile hydrogen attached to nitrogen to form a 1.4 addition product.

2. Process according to claim 1, wherein the compound containing labile hydrogen is selected from the group consisting of primary and secondary amines.

3. Process for the production of intermediates, which comprises reacting at atmospheric pressure 1.3-butadiene-4-nitrile with a diprimary amine to form a 1.4 addition product.

4. Process for the production of intermediates, which comprises reacting at atmospheric pressure 1.3-butadiene-4-nitrile with a polymethylene diprimary amine to form a 1.4 addition product.

SIDNEY JAMES ALLEN.
JAMES GORDON NAPIER DREWITT.

REFERENCES CITED

The following references are of record in the file of this patent:

UNITED STATES PATENTS

| Number | Name | Date |
|---|---|---|
| 1,992,615 | Hoffman et al. | Feb. 20, 1935 |
| 2,073,363 | Carothers | Mar. 9, 1937 |
| 2,396,626 | Wiest et al. | Mar. 12, 1946 |
| 2,413,917 | Harman | Jan. 7, 1947 |
| 2,484,683 | Bruson | Oct. 11, 1949 |

FOREIGN PATENTS

| Number | Country | Date |
|---|---|---|
| 598,309 | Great Britain | Feb. 16, 1948 |

OTHER REFERENCES

Raske, Ber. Deut. Chem., vol. 38, p. 3608 (1905).

Posner et al., Ber. Deut. Chem., vol. 43, p. 2670 (1910).

Bruylants, Beilstein (Handbook, 4th ed.), vol. 4, 2nd suppl., p. 890 (1942).